(12) United States Patent
Ashikaga et al.

(10) Patent No.: US 12,738,002 B2
(45) Date of Patent: Sep. 15, 2026

(54) INFORMATION PROCESSING METHOD, DEVICE, RECORDING MEDIUM AND SYSTEM FOR ACQUIRING AVATAR INFORMATION OF AN AVATAR THAT PERFORMS AN ACTION RELATED TO CUSTOMIZATION OF A TARGET OBJECT

(71) Applicant: CASIO COMPUTER CO., LTD., Tokyo (JP)

(72) Inventors: Takaharu Ashikaga, Tokyo (JP); Naohiko Yasuda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 159 days.

(21) Appl. No.: 18/891,422

(22) Filed: Sep. 20, 2024

(65) Prior Publication Data

US 2025/0104375 A1 Mar. 27, 2025

(30) Foreign Application Priority Data

Sep. 25, 2023 (JP) ................................ 2023-159316

(51) Int. Cl.
*G06T 19/20* (2011.01)
*G06T 13/40* (2011.01)

(52) U.S. Cl.
CPC .............. *G06T 19/20* (2013.01); *G06T 13/40* (2013.01); *G06T 2219/2012* (2013.01)

(58) Field of Classification Search
CPC .. G06T 19/20; G06T 13/40; G06T 2219/2012
See application file for complete search history.

(56) References Cited

U.S. PATENT DOCUMENTS 10,074,124 B1 * 9/2018 Evans ................ G06Q 30/0621
2009/0069084 A1 * 3/2009 Reece ..................... A63F 13/10 463/32
2014/0229850 A1 * 8/2014 Makofsky ........... G06F 3/04815 715/747
2017/0116667 A1 * 4/2017 High ..................... G06T 19/006
2025/0014092 A1 * 1/2025 Bleicher ............ G06Q 30/0643

FOREIGN PATENT DOCUMENTS

JP 2008-217142 A 9/2008
JP 2022-036689 A 3/2022

* cited by examiner

*Primary Examiner* — Maurice L. Mcdowell, Jr.
(74) *Attorney, Agent, or Firm* — CHEN YOSHIMURA LLP

(57) ABSTRACT

An information processing method executed by an information processing device having at least one memory and at least one processor includes: acquiring avatar information related to characteristics of an avatar that performs an action related to customization of a target object in a virtual space; and determining a configuration of a customization object to be used for the customization in the virtual space based on the avatar information.

19 Claims, 16 Drawing Sheets

| Avatar ID | User ID | Color used | | | | | Possessed Object | | |
|---|---|---|---|---|---|---|---|---|---|
| | | Avatar Color 1 | Avatar Color 2 | Avatar Color 3 | Avatar Color 4 | ... | Name | Object ID | Customization ID |
| A001 | U001 | Yellow (25%) | White (20%) | Blue (15%) | Red (10%) | ... | Clock | OJ029 | D2921 |
| A002 | U002 | Pink (30%) | Black (25%) | Purple (15%) | Blue (10%) | ... | .. | .. | .. |
| .. | .. | .. | .. | .. | .. | .. | .. | .. | .. |

| Color palette No. | Color |
| --- | --- |
| CP1 | Yellow |
| CP2 | White |
| CP3 | Blue |
| CP4 | Red |
| CP5 | Orange |
| CP6 | Black |
| CP7 | (Def) |
| CP8 | (Def) |
| ⋮ | ⋮ |
| CP14 | (Def) |

235

| Priority | Component | Color scheme a | Color scheme b | Color scheme c | ... |
|---|---|---|---|---|---|
| 1 | Bezel C1 | Avatar color 1 | Avatar color 2 | Avatar color 3 | ... |
| 2 | Face C2 | Avatar color 2 | Avatar color 1 | Avatar color 1 | ... |
| 3 | Short band C3 | Avatar color 3 | Avatar color 3 | Avatar color 2 | ... |
| 4 | Long band C4 | Avatar color 4 | Avatar color 6 | Avatar color 5 | ... |
| 5 | Strap keeper C5 | Avatar color 5 | Avatar color 4 | Avatar color 6 | ... |
| 6 | Buckle C6 | Avatar color 6 | Avatar color 5 | Avatar color 4 | ... |

| Part ID | Part | Part color 1 | Part color 2 | Part color 3 | Corresponding components |
|---|---|---|---|---|---|
| P1 | Hair/hat | Brown (80%) | Black (20%) | -- | Bezel C1 |
| P2 | Face/face paint | Orange (70%) | White (20%) | Yellow (10%) | Face C2 |
| P3 | Upper body clothes | Pink (50%) | Red (30%) | White (20%) | Short band C3 |
| P4 | Lower body clothes | Red (60%) | White (30%) | Yellow (10%) | Long band C4 |
| P5 | Shoes | Black (80%) | Blue (20%) | -- | Strap keeper C5 |
| P6 | Accessories | Yellow (60%) | Gold (40%) | -- | Buckle C6 |

| Color palette No. | Color | | | | | |
|---|---|---|---|---|---|---|
| | Bezel C1 | Face C2 | Short band C3 | Long band C4 | Strap Keeper C5 | Buckle C6 |
| CP1 | Brown | Orange | Pink | Red | Black | Yellow |
| CP2 | Black | White | Red | White | Blue | Gold |
| CP3 | (Def) | Yellow | White | Yellow | (Def) | (Def) |
| CP4 | (Def) | (Def) | (Def) | (Def) | (Def) | (Def) |
| : | : | : | : | : | : | : |

FIG. 15

INFORMATION PROCESSING METHOD, DEVICE, RECORDING MEDIUM AND SYSTEM FOR ACQUIRING AVATAR INFORMATION OF AN AVATAR THAT PERFORMS AN ACTION RELATED TO CUSTOMIZATION OF A TARGET OBJECT

BACKGROUND OF THE INVENTION

Technical Field

The present disclosure relates to an information processing method, an information processing system, an information processing device, and a storage medium.

Background Art

For example, as disclosed in Japanese Patent Application Laid-Open Publication No. 2008-217142, conventionally, there are services where an avatar is moved in response to a user's operation in a virtual space constructed by a computer, allowing the user to communicate with other users who operate other avatars and participate in events and games held in the virtual space. Some of these services allow avatars to be equipped with product objects such as clothes and accessories.

SUMMARY OF THE INVENTION

Features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an information processing method executed by an information processing device having at least one memory and at least one processor, comprising: acquiring avatar information related to characteristics of an avatar that performs an action related to customization of a target object in a virtual space; and determining a configuration of a customization object to be used for the customization in the virtual space based on the avatar information.

In another aspect, the present disclosure provides an information processing device comprising a processing unit that performs the following: acquiring avatar information related to characteristics of an avatar that performs an action related to customization of a target object in a virtual space; and determining a configuration of a customization object to be used for the customization in the virtual space based on the avatar information.

In another aspect, the present disclosure provides a non-transitory computer readable storage medium, the storage medium storing therein a program that causes a computer to execute the following: acquiring avatar information related to characteristics of an avatar that performs an action related to customization of a target object in a virtual space; and determining a configuration of a customization object to be used for the customization in the virtual space based on the avatar information.

In another aspect, the present disclosure provides an information processing system including a plurality of information processing devices each having at least one memory and at least one processor that executes one or more commands stored in the at least one memory, wherein the information processing system performs the following: acquiring avatar information related to characteristics of an avatar that performs an action related to customization of a target object in a virtual space; and determining a configuration of a customization object to be used for the customization in the virtual space based on the avatar information.

Further features of the present invention will become apparent from the following description of exemplary embodiments (with reference to the attached drawings).

It is to be understood that both the foregoing general description and the following detailed description are exemplary and explanatory, and are intended to provide further explanation of the invention as claimed.

BRIEF DESCRIPTION OF THE DRAWINGS

FIG. 11 is a diagram showing content of sample color scheme data.

FIG. 14 is a diagram showing content of avatar part information.

FIG. 15 is a diagram showing content of color palette data according to a modification example.

DETAILED DESCRIPTION OF EMBODIMENTS

Below, embodiments of the present disclosure will be described with reference to the drawings.

Overview of Information Processing System

Figure 1:
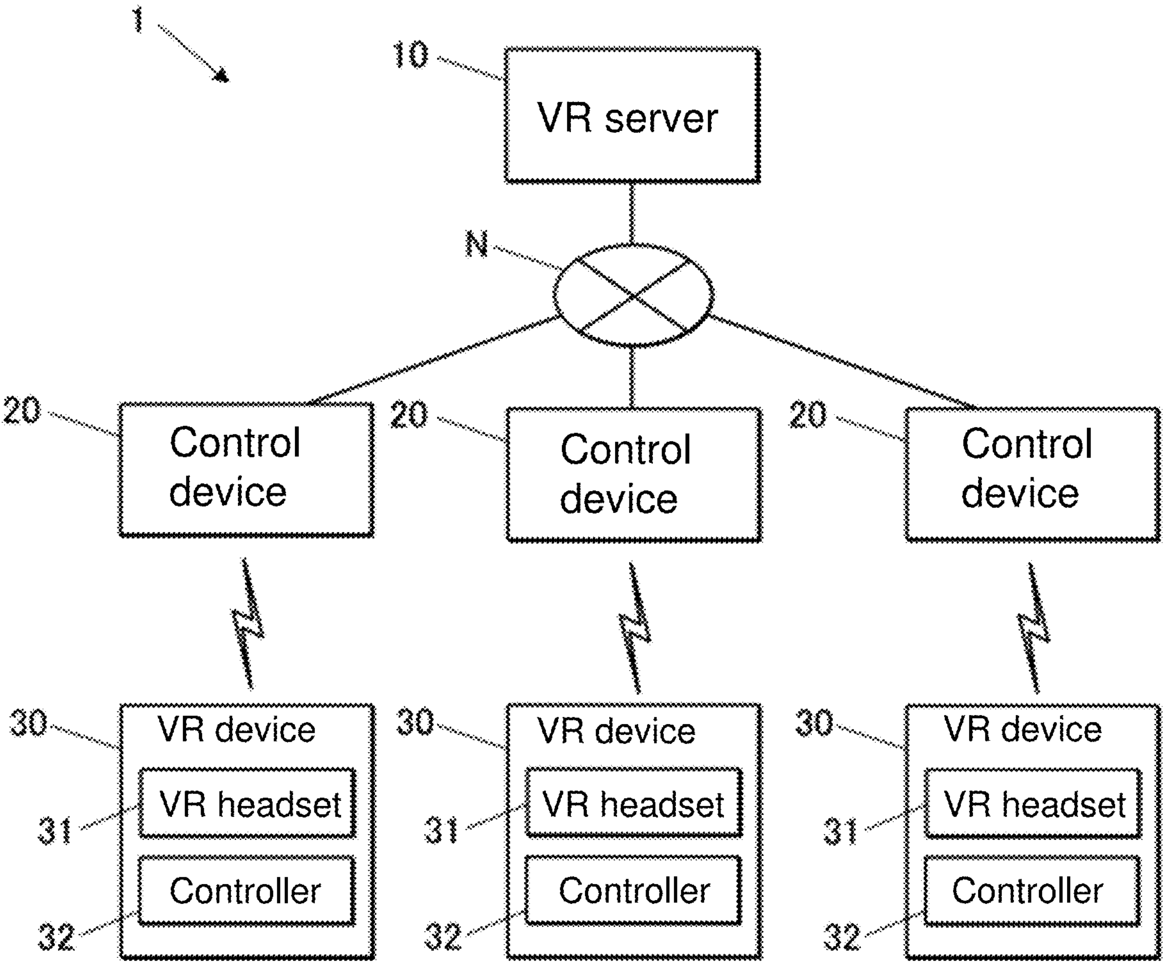
FIG. 1 is a diagram illustrating a configuration of an information processing system.

FIG. 1 is a diagram showing the configuration of an information processing system 1.

The information processing system 1 includes a VR server 10, a plurality of control devices 20 (information processing devices), and a plurality of VR devices 30 (terminal devices). The information processing system 1 provides a variety of services in a three-dimensional virtual space 2 (metaverse) (see FIG. 6) constructed by a computer to a plurality of users who use the information processing system 1. The information processing system 1 can also provide users with services that apply VR (virtual reality) in the metaverse (hereinafter referred to as "VR services"). VR is a technology that allows users to experience a virtual world constructed in the virtual space 2 as if it were reality.

Each user of the information processing system 1 uses one control device 20 and one VR device 30. The control device 20 and the VR device 30 are connected to each other so that data can be transmitted and received by wireless communication. The VR device 30 includes a VR headset 31 (head-mounted device) and a controller 32 that are worn by the user when in use. The VR device 30 detects the user's movements and input operations using the VR headset 31 and the controller 32, and transmits the detection results to the control device 20. The control device 20 transmits data such as a VR screen 3151 (see FIG. 6) of the virtual space 2 and audio to the VR headset 31 in response to the user's movements and input operations detected by the VR device 30, and causes the VR screen 3151 to be displayed and audio to be output. In this way, VR is realized by displaying the VR screen 3151 of the virtual space 2 on the VR headset 31 in real time and outputting audio in response to the user's movements and input operations. In the virtual space 2, a character called an avatar 40 (see FIGS. 8 and 9) acts on behalf of the user. In other words, a VR screen 3151 of the virtual space 2 seen from the viewpoint of the avatar 40 is displayed on the VR headset 31 in real time.

The VR server 10 and the plurality of control devices 20 are connected to each other via a network N, and can transmit and receive data to and from each other. The network N is, for example, the Internet, but is not limited to this.

The following describes each component of the information processing system 1 in detail.

(VR Server Configuration)

Figure 2:
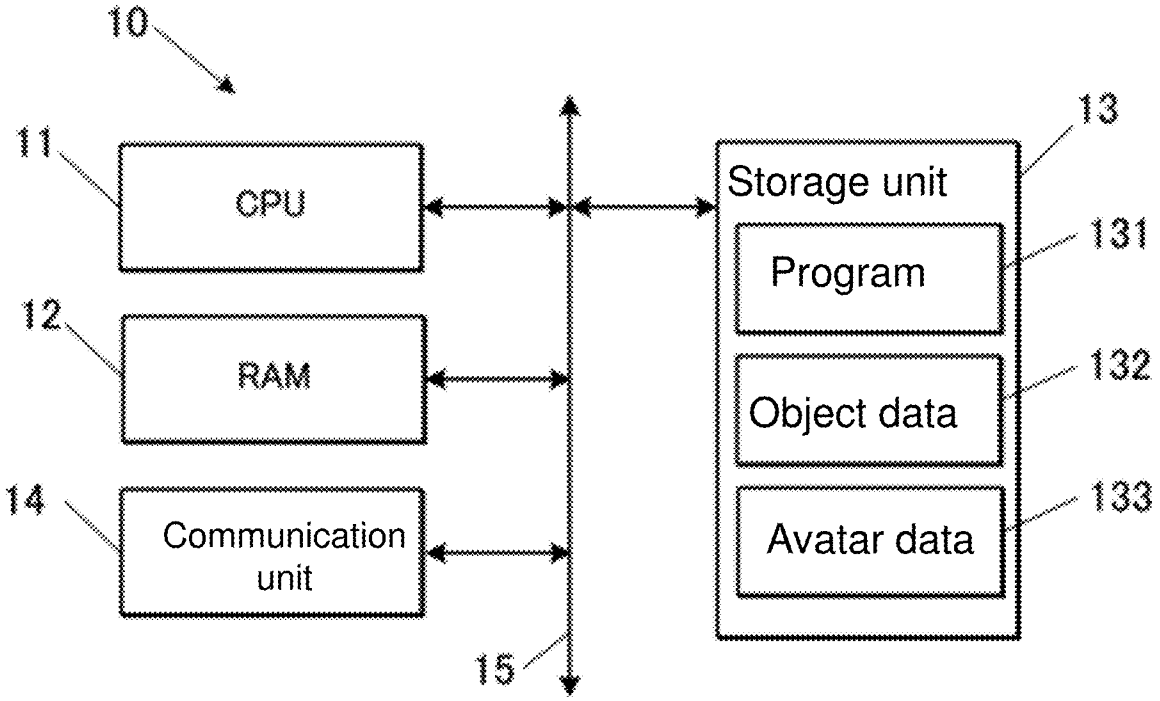
FIG. 2 is a block diagram showing a functional configuration of a VR server.

FIG. 2 is a block diagram showing the functional configuration of the VR server 10.

The VR server 10 includes a CPU 11 (Central Processing Unit), a RAM 12 (Random Access Memory), a storage unit 13, a communication unit 14, a bus 15, and the like. Each unit of the VR server 10 is connected via the bus 15. The VR server 10 may further include an operation unit and a display unit used by the administrator of the VR server 10. The VR server 10 acquires and manages various data necessary for providing the VR service, and transmits the data to the plurality of control devices 20 as necessary.

The CPU 11 is a processor that reads and executes a program 131 stored in the storage unit 13 and controls the operation of each part of the VR server 10 by performing various arithmetic processing. The VR server 10 may have a plurality of processors (e.g., a plurality of CPUs), and the plurality of processes performed by the CPU 11 of this embodiment may be executed by the plurality of processors. In this case, the plurality of processors may be involved in a common process, or the plurality of processors may independently execute different processes in parallel.

The RAM 12 provides a working memory space for the CPU 11 and stores temporary data.

The storage unit 13 is a non-transient recording medium that can be read by the CPU 11 as a computer, and stores the program 131 and various types of data. The storage unit 13 includes non-volatile memories such as a hard disk drive (HDD) and a solid state drive (SSD). The program 131 is stored in the storage unit 13 in the form of a computer-readable program code. The data stored in the storage unit 13 includes object data 132 and avatar data 133. The object data 132 includes information on the position, appearance, etc. of each object in the virtual space 2.

Figure 3:
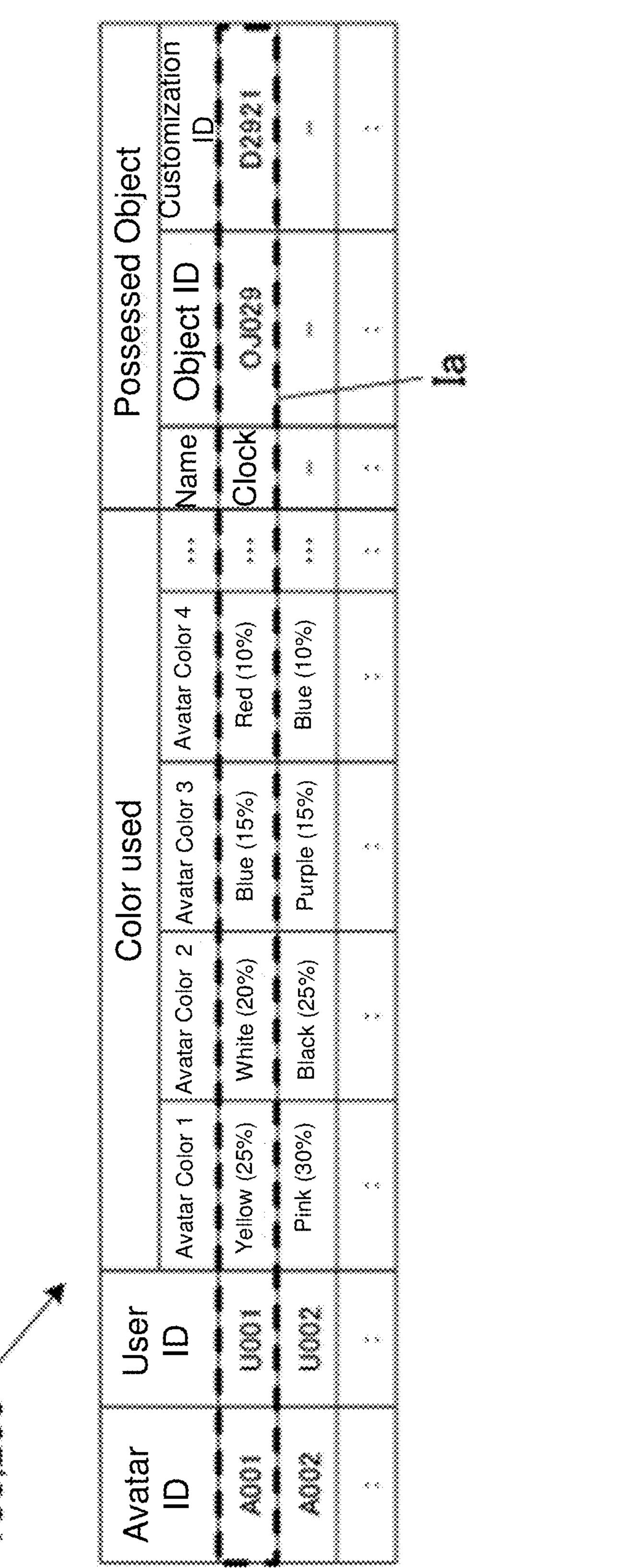
FIG. 3 is a diagram showing an example of the content of avatar data.

FIG. 3 is a diagram showing an example of the content of avatar data 133.

One data row of avatar data 133 corresponds to avatar information Ia related to the characteristics of an avatar corresponding to one user. The "avatar ID" in avatar information Ia is a unique code assigned to the avatar 40. The "user ID" is a unique code assigned to the user.

The "used colors" represent the multiple colors used in the appearance of the avatar 40 (the multiple colors constituting the avatar 40) and the percentage (%) of each color in the overall appearance of the avatar 40. In FIG. 3, the colors are arranged in descending order of percentage as "avatar color 1", "avatar color 2", "avatar color 3", . . . . For example, for the avatar 40 with an avatar ID of "A001", the avatar color 1 is "yellow (25%)", the avatar color 2 is "white (20%)", the avatar color 3 is "blue (15%)", and the avatar color 4 is "red (10%)". In FIG. 3, the colors up to "avatar color 4" are shown, but data from "avatar color 5" onwards, which is not shown in the figure, is also included depending on the number of colors used in the avatar 40. The colors of the appearance of the avatar 40 are, for example, the colors of objects such as clothes, shoes, and accessories worn by the avatar 40, and the colors of the parts of the avatar 40 exposed to the outside.

"Possessed object" represents information related to an object possessed by the avatar 40. "Possessed object" includes the following sub-items: "name" that represents the name of the object; "object ID" that is a unique code assigned to the object; and "customization ID" that is a unique code representing the customization details of the object. Note that the state in which the avatar 40 possesses an object is not limited to a state in which the object is worn, but also includes a state in which the object is held without being worn. In the example shown in FIG. 3, the avatar 40 with the avatar ID "A001" possesses a watch product object 70 (see FIG. 9). The watch product object 70 can be worn on the wrist of the avatar 40.

Avatar data 133 may include information other than the information illustrated in FIG. 3.

Returning to FIG. 2, the communication unit 14 performs communication operations according to a predetermined communication standard. Through this communication operation, the communication unit 14 transmits and receives data to and from the control device 20 via the network N.

(Configuration of the Control Device)

Figure 4:
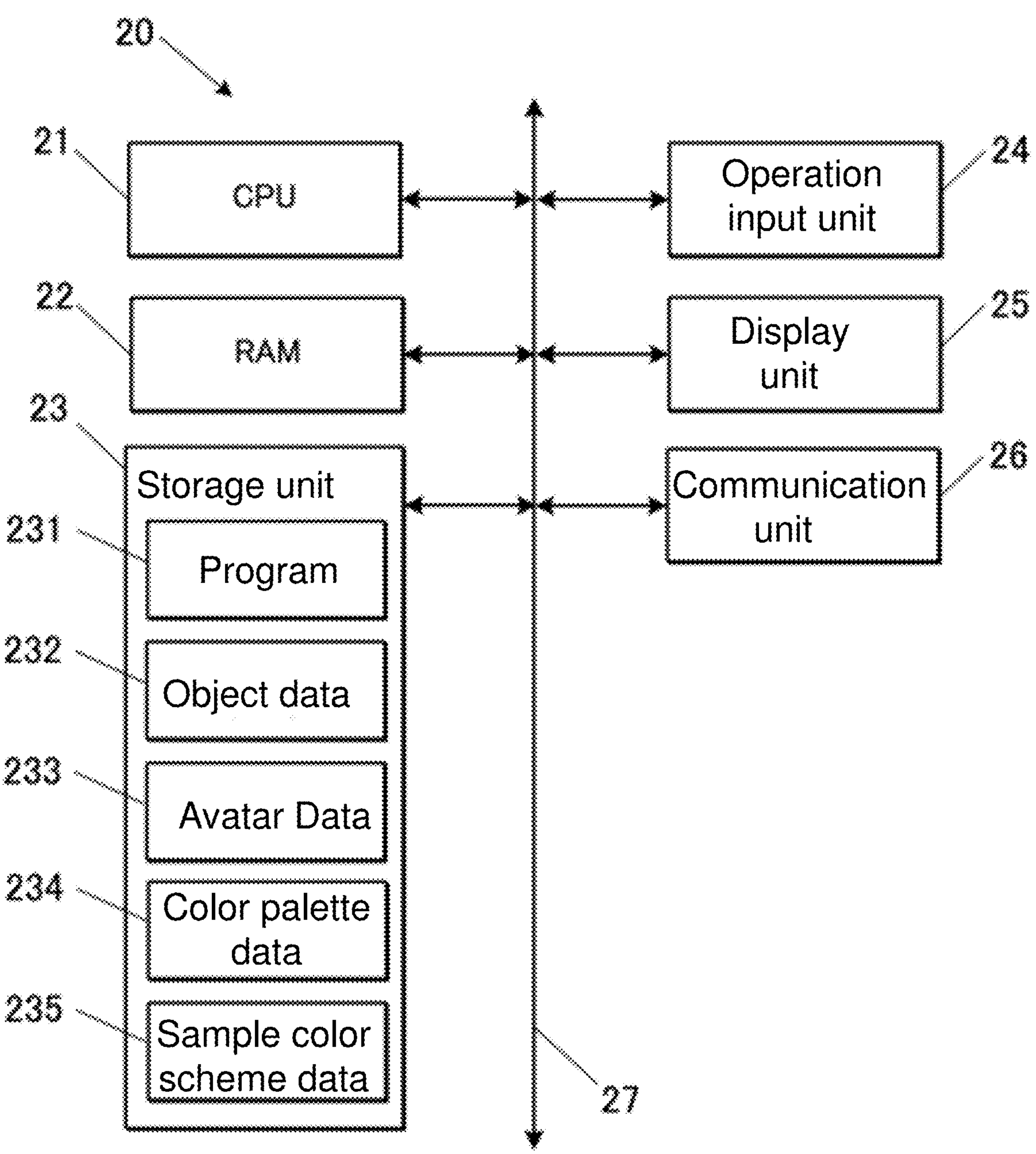
FIG. 4 is a block diagram showing a functional configuration of a control device.

FIG. 4 is a block diagram showing the functional configuration of the control device 20. The control device 20 includes a CPU 21 (processing unit), a RAM 22, a storage unit 23, an operation input unit 24, a display unit 25, a communication unit 26, a bus 27, and the like. Each unit of the control device 20 is connected via the bus 27. The control device 20 is, for example, a notebook PC or a desktop PC, but is not limited to these and may be a tablet terminal, a smartphone, or the like.

The CPU 21 is a processor that reads and executes a program 231 stored in the storage unit 23 and performs various arithmetic processing, thereby controlling the operation of each unit of the control device 20. The control device 20 may have a plurality of processors (e.g., a plurality of CPUs), and the plurality of processes performed by the CPU 21 of this embodiment may be executed by the plurality of processors. In this case, a "processing unit" is constituted of the plurality of processors. In this case, the plurality of processors may be involved in a common process, or the plurality of processors may independently execute different processes in parallel.

The RAM 22 provides the CPU 21 with a working memory space and stores temporary data.

The storage unit 23 is a non-transient recording medium that can be read by the CPU 21 as a computer, and stores the program 231 and various types of data. The storage unit 23 includes non-volatile memory such as an HDD or SSD. The program is stored in the storage unit 23 in the form of computer-readable program code. Data stored in the storage unit 23 includes object data 232, avatar data 233, color palette data 234, and sample color scheme data 235. The object data 232 is data received from the VR server 10 and stored in the storage unit 23, and includes at least a portion of the same data as the object data 132 of the VR server 10. The avatar data 233 is data received from the VR server 10 and stored in the storage unit 23, and includes at least a portion of the same data as the avatar data 133 of the VR server 10. The content of the color palette data 234 and the sample color scheme data 235 will be described later.

The operation input unit 24 accepts input operations from the user and outputs an input signal corresponding to the input operation to the CPU 21. The operation input unit 24 includes input devices such as a keyboard, a mouse, and a touch panel.

The display unit 25 displays, to the user, information related to the processing details and various statuses in the control device 20, as well as various websites including EC sites. The display unit 25 includes a display device such as a liquid crystal display.

The communication unit 26 performs communication operations according to a predetermined communication standard. Through this communication operation, the communication unit 26 transmits and receives data to and from the VR server 10 via the network N. The communication unit 26 also transmits and receives data to and from the VR device 30 via wireless communication.

(Configuration of VR Device)

Figure 5:
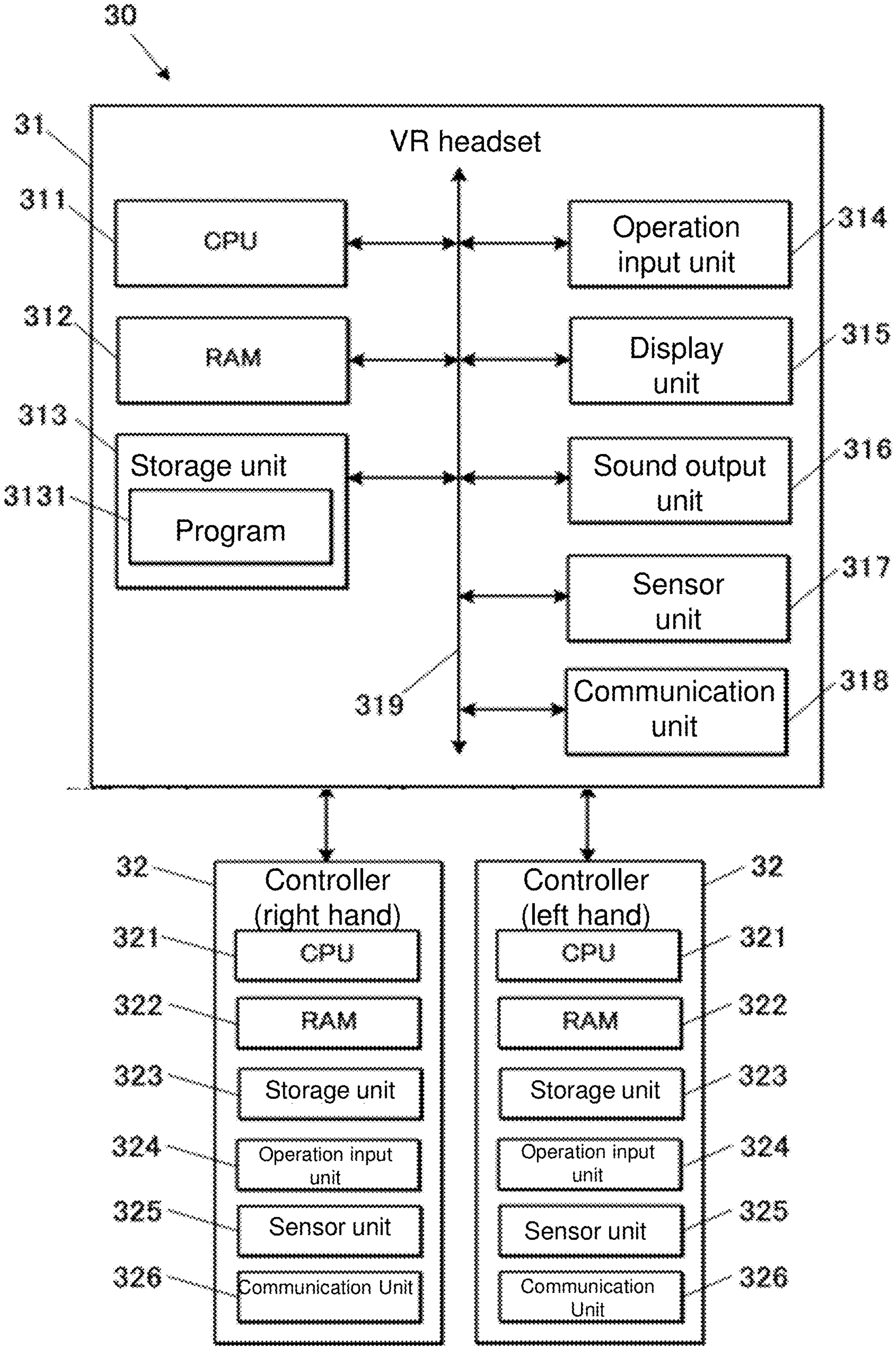
FIG. 5 is a block diagram showing a functional configuration of a VR device.

FIG. 5 is a block diagram showing the functional configuration of the VR device 30.

The VR device 30 includes a VR headset 31, a controller 32 for the right hand, and a controller 32 for the left hand. The two controllers 32 are connected to the VR headset 31 wirelessly or by wire so as to be able to perform data communication. The VR headset 31 is worn on the user's head when in use. The controller 32 is worn or held by the user's hand when in use. The controller 32 corresponds to the "input unit."

The VR headset 31 includes a CPU 311, a RAM 312, a storage unit 313, an operation input unit 314, a display unit 315, a sound output unit 316, a sensor unit 317, a communication unit 318, a bus 319, and the like. Each unit of the VR headset 31 is connected via the bus 319.

The CPU 311 is a processor that controls the operation of each unit of the VR headset 31 by reading and executing a program 3131 stored in the storage unit 313 and performing various arithmetic processes.

The RAM 312 provides working memory space for the CPU 311 and stores temporary data.

The storage unit 313 is a non-transient recording medium that can be read by the CPU 311 as a computer, and stores the program 3131 and various types of data.

The operation input unit 314 has various switches, buttons, etc., accepts input operations from the user, and outputs an input signal corresponding to the input operation to the CPU 311. The operation input unit 314 corresponds to the "input unit."

The display unit 315 displays an image that is visible to the user wearing the VR headset 31. The display unit 315 includes a liquid crystal display or an organic EL display, etc., that is provided in a position visible to the user wearing the VR headset 31. Image data of the image displayed by the display unit 315 is transmitted from the control device 20 to the VR headset 31. The display unit 315 displays the image based on the received image data in accordance with the control of the CPU 311.

The sound output unit 316 outputs various sounds that are recognized by the hearing of the user wearing the VR headset 31 in accordance with the control of the CPU 311.

The sensor unit 317 detects the movement and orientation of the head of the user wearing the VR headset 31. The sensor unit 317 includes, for example, a three-axis acceleration sensor that detects acceleration in three orthogonal axial directions, a three-axis gyro sensor that detects angular velocity around three orthogonal axial directions, and a three-axis geomagnetic sensor that detects geomagnetism in three orthogonal axial directions. The CPU 311 derives the movement and orientation of the user's head based on the acceleration data, angular velocity data, and geomagnetic data received from the sensor unit 317. The sensor unit 317 is capable of receiving the user's movement and orientation as user operation, and corresponds to the "input unit."

The communication unit 318 performs communication operations according to a predetermined communication standard. Through this communication operation, the communication unit 318 transmits and receives data to and from the controller 32 and the control device 20 via wireless communication.

The controller 32 includes a CPU 321 that controls the operation of the controller 32, a RAM 322 that provides working memory space for the CPU 321, a storage unit 323 that stores programs and data necessary for executing the programs, an operation input unit 324, a sensor unit 325, and a communication unit 326 that performs data communication with the VR headset 31.

The operation input unit 324 (input unit) includes various switches, buttons, operation keys, and the like, and receives input operations from the user and outputs an input signal corresponding to the input operation to the CPU 321. The operation input unit 324 may also be capable of separately detecting the movement of each of the user's fingers.

The sensor unit 325 includes a three-axis acceleration sensor, a three-axis gyro sensor, and a three-axis geomagnetic sensor, and detects the movement and direction of the user's hand holding or wearing the controller 32. The configuration and operation of the sensor unit 325 may be the same as the sensor unit 317 of the VR headset 31, for example.

The configuration of the VR device 30 is not limited to the above.

For example, the VR device 30 may further include an auxiliary sensor device that is not held or worn by the user. This sensor device may be, for example, a device that is installed on the floor or the like and optically detects the user's movements or the movements of the VR headset 31 and the controllers 32 by laser scanning or the like.

In addition, one of the controllers 32 may be omitted when there is no need to detect the movements of both hands separately. In addition, when the VR headset 31 is capable of detecting the necessary user movements and input operations, the controller 32 may be omitted.

(Operation of the Information Processing System)

Next, the operation of the information processing system 1 will be described.

In the following description, the main processing is performed by the CPU 11 of the VR server 10, the CPU 21 of the control device 20, the CPU 311 of the VR headset 31, or the CPU 321 of the controller 32. However, for convenience of explanation, the VR server 10, the control device 20, the VR headset 31, or the controller 32 may be described as the main processing unit.

Furthermore, the user's movements and input operations detected by the VR device 30 are hereinafter collectively referred to as "user operations." That is, in this embodiment, "user operations" include input operations detected by the operation input unit 314 of the VR headset 31 and the operation input unit 324 of the controller 32, and operations detected by the sensor unit 317 of the VR headset 31 and the sensor unit 325 of the controller 32.

The following description will focus on the image display operation of the VR headset 31, and will omit descriptions of other operations such as sound output.

<Basic Operations Related to VR>

When a user begins using the VR service provided by the information processing system 1, the user puts on the VR headset 31 and the controllers 32 of the VR device 30 and performs a predetermined operation to start the VR service. In response to this operation, user authentication information is sent from the control device 20 to the VR server 10, and when the user is authenticated by the VR server 10, the authentication result is returned from the VR server 10 to the control device 20, and the provision of VR services to the authenticated user begins.

When the VR service is started, the control device 20 downloads the object data 232 and avatar data 233 required for displaying the virtual space 2 from the VR server 10 and stores them in the storage unit 23. In addition, the control device 20 starts transmitting image data of the virtual space 2 to the VR headset 31 of the VR device 30. Here, image data of the virtual space 2 as seen from the viewpoint of the avatar 40 located at a predetermined initial position in the virtual space 2 is transmitted to the VR headset 31. The image data is generated based on the object data 232 and the like. In response to the transmission of the image data, the display unit 315 of the VR headset 31 starts displaying the VR screen 3151 of the virtual space 2 based on the received image data.

Figure 6:
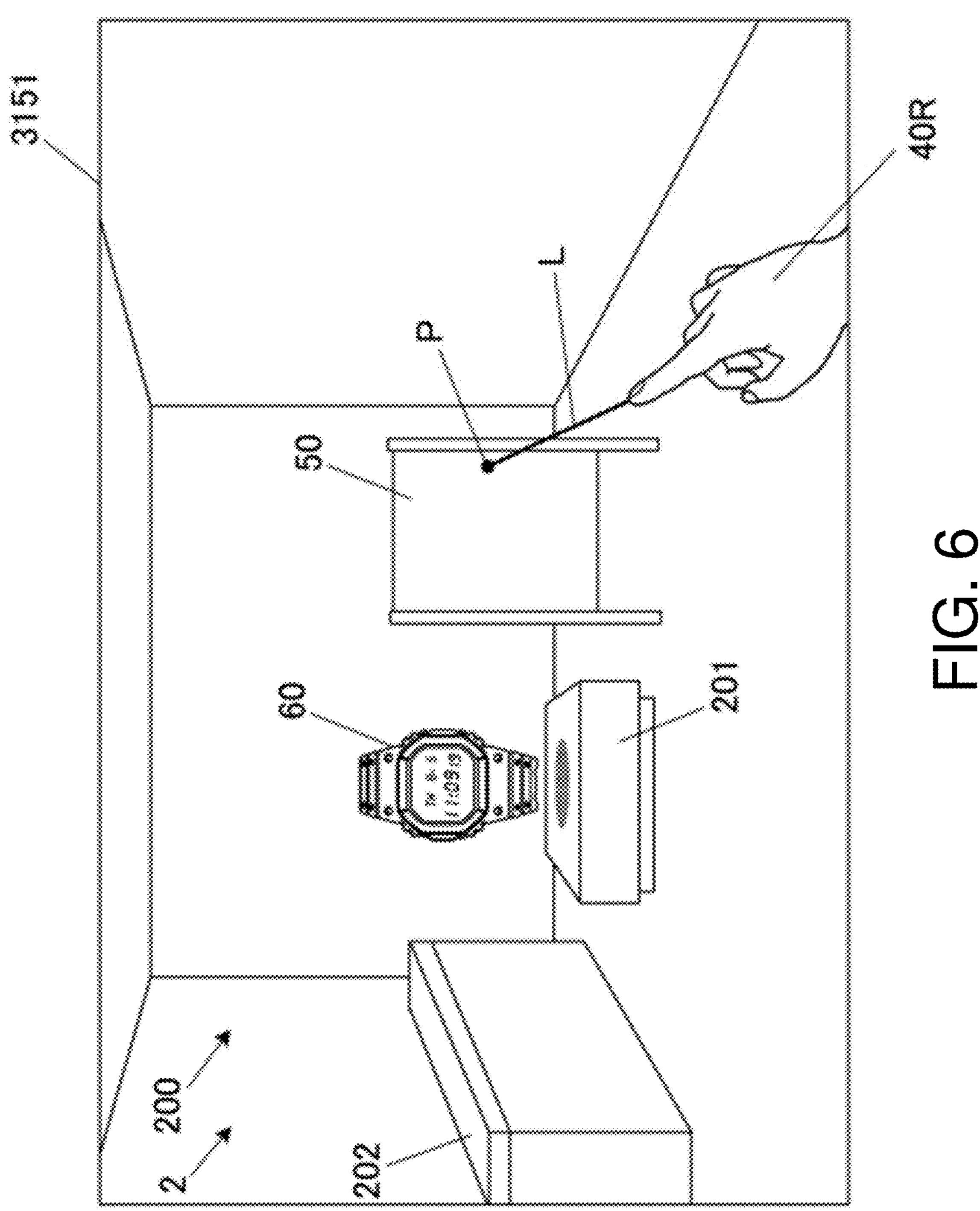
FIG. 6 is a diagram showing a VR screen.

FIG. 6 is a diagram showing a VR screen 3151.

In this embodiment, an example will be described in which a user and their avatar 40 receive services at a virtual store 200 for watches provided in the virtual space 2. The virtual store 200 customizes and sells a watch product object 70 (target object). The VR screen 3151 includes an image that represents the interior of the virtual store 200 in three dimensions. Inside the virtual store 200, an IF object 50 (interface object), a sample object 60, a base 201 for the sample object 60, a checkout counter 202 for carrying out the product purchase procedure, and the like are provided. The position, orientation, color, shape, and the like of each object in the virtual store 200 are determined based on the information of the object data 232. The IF object 50 and the sample object 60 are respectively embodiments of a customization object used to customize a target object in the virtual space 2.

The IF object 50 is an interface operated by the avatar 40 to customize the design of the watch product object 70.

The sample object 60 is an object that is an enlarged model of the watch product object 70. The sample object 60 represents the customization details of the target object performed by the IF object 50. The sample object 60 is designed to reflect the customization performed by the avatar 40 in real time. The sample object 60 is placed in the space above the base 201.

The sample object 60 and the corresponding product object 70 have a plurality of components (a plurality of parts) in common. The sample object 60 and the product object 70 of this embodiment have a bezel C1, a face C2, a short band C3, a long band C4, a strap keeper C5, and a buckle C6 (see FIGS. 8 and 9 for all of these) as the plurality of components. In the following, any one of the bezel C1, face C2, short band C3, long band C4, strap keeper C5, and buckle C6 will be referred to as "component C."

When the virtual store service is started, the VR device 30 starts to detect user operations, and the detection results are continuously transmitted to the control device 20. The control device 20 controls the movement of the avatar 40 in the virtual store 200 (virtual space 2) according to the received user operations. That is, the control device 20 converts the received user operations into movements of the avatar 40 in the virtual store 200, and identifies and updates the position, orientation, and posture, etc., of the avatar 40 in the virtual store 200 in real time. Then, the control device 20 generates image data of the virtual store 200 seen from the viewpoint of the avatar 40 in the updated position and orientation, and transmits it to the VR headset 31. This generation and transmission of image data is repeated at a predetermined frame rate. The display unit 315 of the VR headset 31 displays the VR screen 3151 at the above frame rate based on the received image data of the virtual store 200. As a result, a user wearing the VR headset 31 can view the virtual store 200 in real time from the viewpoint of the avatar 40, which moves around and operates in the virtual store 200 according to the user's operation. In addition, the control device 20 transmits information such as the position, direction, and posture of the avatar 40 to the VR server 10.

<Operations Related to Customization of Product Object>

As shown in FIG. 6, in the virtual store 200, a virtual line L extends from the fingertip of the right hand 40R of the avatar 40, and a pointer P is generated at the intersection of the virtual line L and the object. By performing a predetermined operation with this pointer P aligned with the position of the desired object, an object within the virtual store 200 can be selected. When the user wants to customize the design of a clock object, the user uses the pointer P to operate the IF object 50 via the movement of the avatar 40.

Figure 7:
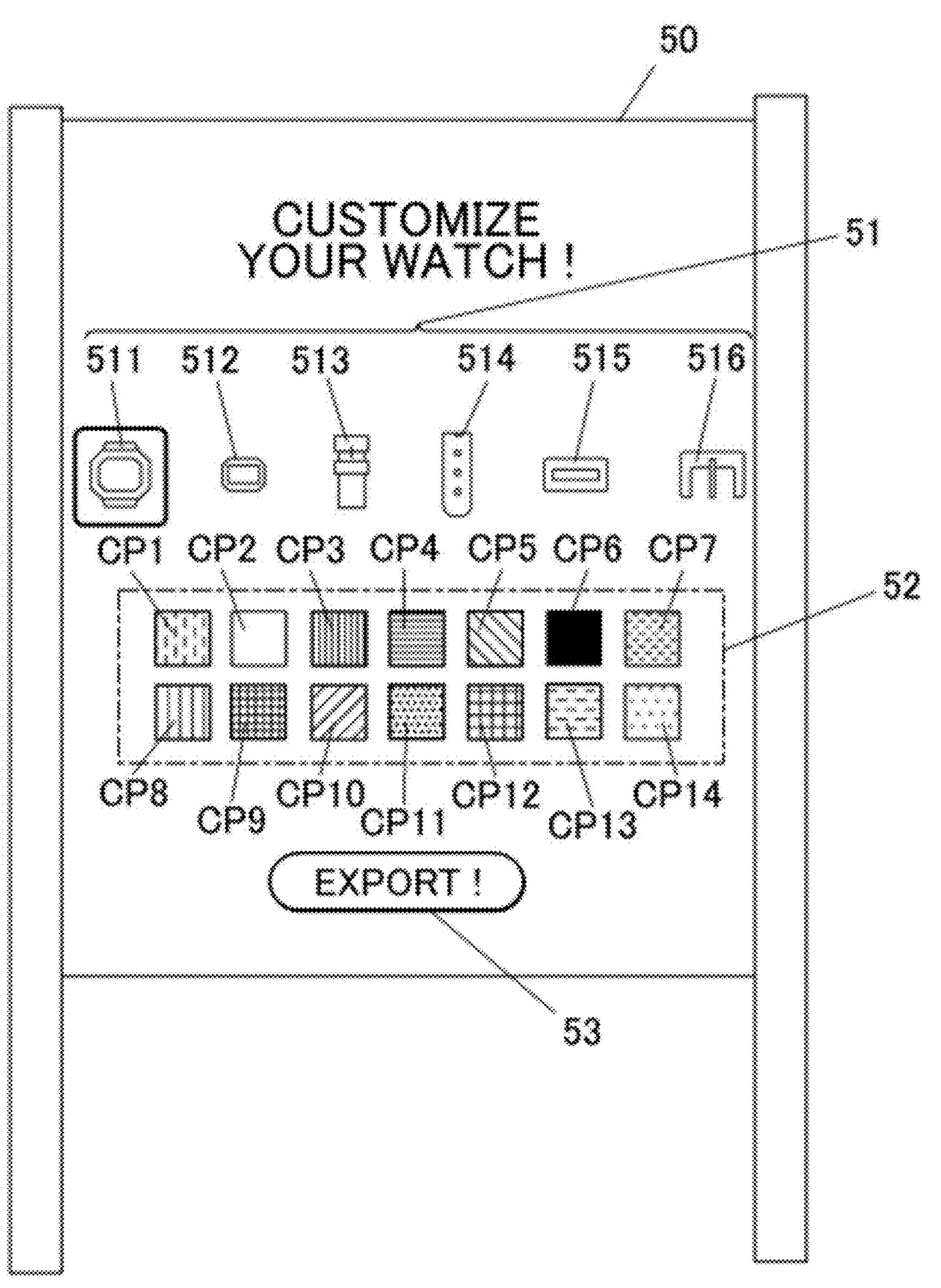
FIG. 7 is a diagram showing an IF object.

FIG. 7 is a diagram showing the IF object 50.

The IF object 50 is a board-shaped object resembling a standing signboard. The IF object 50 is provided with a target selection IF 51, a color selection IF 52, and an export button 53.

The target selection IF 51 is an interface for selecting a component C to be customized from among the plurality of components C (plurality of parts) that make up the product object 70. The target selection IF 51 of this embodiment includes a bezel icon 511 for selecting the bezel C1 of the watch, a face icon 512 for selecting the face C2, a short band icon 513 for selecting the short band C3, a long band icon 514 for selecting the long band C4, a strap keeper icon 515 for selecting the strap keeper C5, and a buckle icon 516 for selecting the buckle C6 as the target for customization. Each of the icons 511 to 516 can be selected using the pointer P described above. In the example shown in FIG. 7, the selected icon (here, the bezel icon 511) is surrounded by a frame. However, the present disclosure is not limited to this, and for example, the display may be configured such that only the selected icon is lit up and the remaining icons are dimmed.

Note that the components C to be customized are merely examples, and components C other than those described above may be customized. For example, in addition to the strap keeper icon 515 corresponding to a single strap keeper, a strap keeper icon corresponding to triple strap keepers may be displayed, and the shape of the strap keeper may be selected from single and triple by selecting one of the strap keeper icons.

The color selection IF52 is an interface for specifying the color of the component C selected by the target selection IF51. The color selection IF52 includes a plurality of color palettes CP corresponding to different colors. The plurality of color palettes CP correspond to "a plurality of selection markers for the avatar to select customization details of the component" and "a plurality of color selection markers for selecting a color of each of the plurality of components". Each color palette CP can be selected using the pointer P described above. In this embodiment, the color selection IF52 has 14 color palettes CP1 to CP14. The color palettes CP1 to CP14 are arranged in two rows. In the first row, color palettes CP1 to CP7 are arranged in order from the left side, which is most likely to catch the eye of the avatar 40 (user), and in the second row, color palettes CP8 to CP14 are arranged in order from the left side. The first row is more likely to catch the eye of the avatar 40 (user) than the second row. Therefore, in the color selection IF 52, the color palettes CP1 to CP14 are arranged in such an order that the one most likely to catch the eye of the avatar 40 (user) comes first. The number of color palettes CP included in the color selection IF 52 may be changed in accordance with the icon selected from among the icons 511 to 516 in the target selection IF 51.

By selecting one of the color palettes CP in the color selection IF 52 with one of the icons 511 to 516 being selected in the target selection IF 51, the color of the component C corresponding to the icon 511 to 516 can be changed. The change in color of the component C is reflected in the sample object 60. In the default state, the sample object 60 is arranged so that the face C2 displaying the time faces a predetermined front direction of the virtual store 200.

Figure 8:
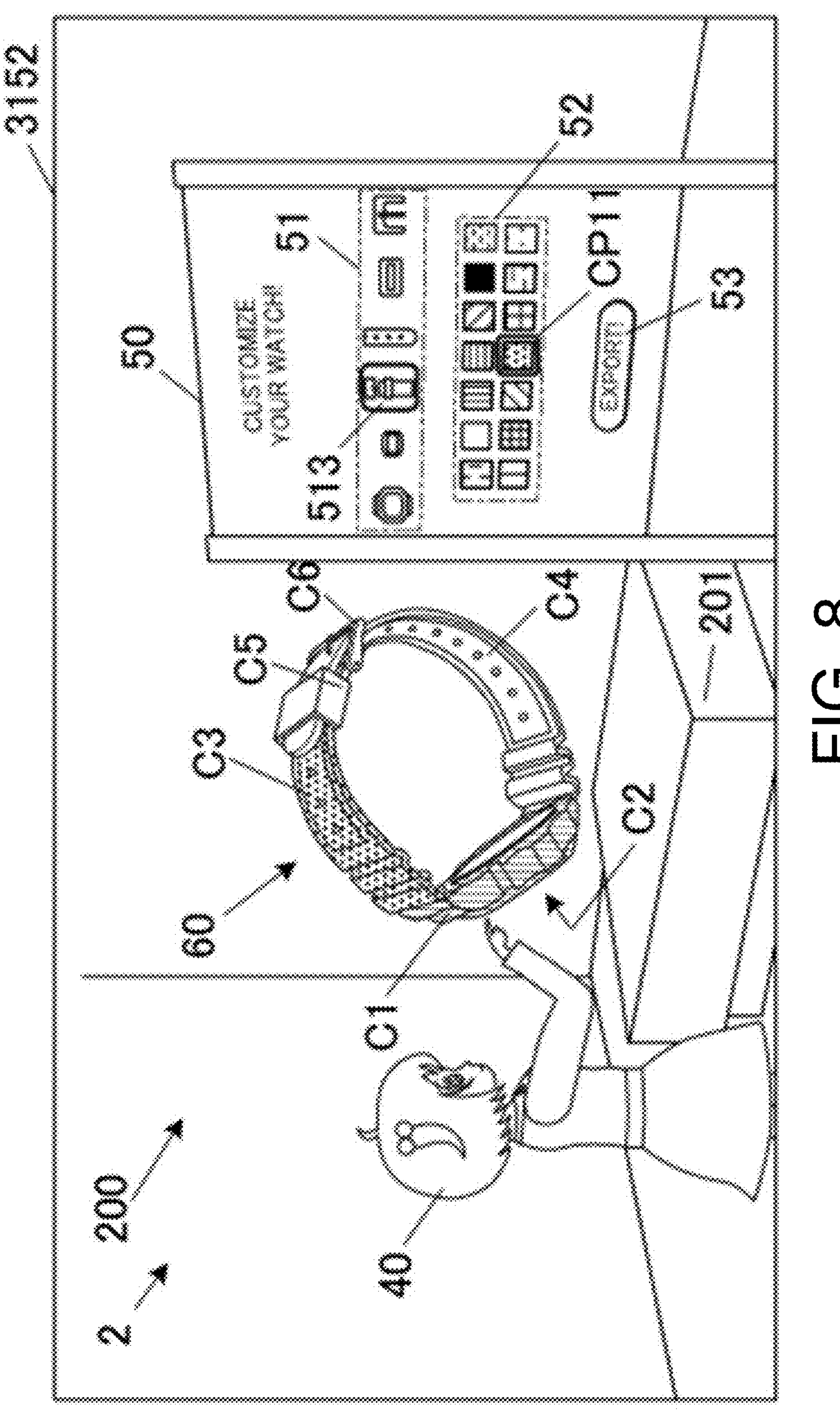
FIG. 8 is a diagram showing a state in which a short band icon is selected.

FIG. 8 shows the state in which the short band icon 513 is selected.

For convenience of explanation, a third-person viewpoint screen 3152 that displays the inside of the virtual store 200 from a third-person viewpoint is shown in FIG. 8. The third-person viewpoint screen 3152 is an image of the virtual store 200 viewed from a predetermined point in the virtual space 2 that is different from the viewpoint of the avatar 40. The user can switch between the VR screen 3151 and the third-person viewpoint screen 3152 by performing a predetermined operation. When any of the icons 511 to 516 of the target selection IF 51 is selected, the orientation of the sample object 60 is changed so that the component C corresponding to the selected icon is easier for the avatar 40 (user) to see. In the example shown in FIG. 8, in response to the selection of the short band icon 513, the sample object 60 is rotated so that the short band C3 of the sample object 60 faces forward.

Also in FIG. 8, with the short band icon 513 selected, the color palette CP11 is selected, which specifies green as the color of the short band C3. In response to this, the short band C3 of the sample object 60 is colored green.

In this way, by selecting the color palette CP of the color selection IF 52 with any one of the icons 511 to 516 of the target selection IF 51 being selected, the color of the component C of the sample object 60 can be changed. By repeating this operation, the color of each component C of the sample object 60 can be changed to customize the design. In other words, when the IF object 50 is operated by the avatar 40, the settings related to the sample object 60 and the product object 70 are changed so that the sample object 60 and the product object 70 are customized according to the content of the operation.

Note that while FIG. 8 illustrates an example of a method for customizing the color of the component C, other design elements of each component C, such as the shape, can be customized in a similar manner. For shape customization, a shape selection IF (not shown) for selecting a shape may be displayed in addition to the color selection IF 52.

The object data 232 received from the VR server 10 includes image data for customizations that can be selected for each component C of the sample object 60, and the control device 20 combines this image data to display the sample object 60 with a modified color and/or shape.

In addition, a configuration may be possible where a plurality of avatars 40 corresponding to a plurality of users can collaboratively customize the design.

After customizing the design as described above, by selecting the export button 53, a product object 70 with a design reflecting the customization details is generated in the virtual space 2.

Figure 9:
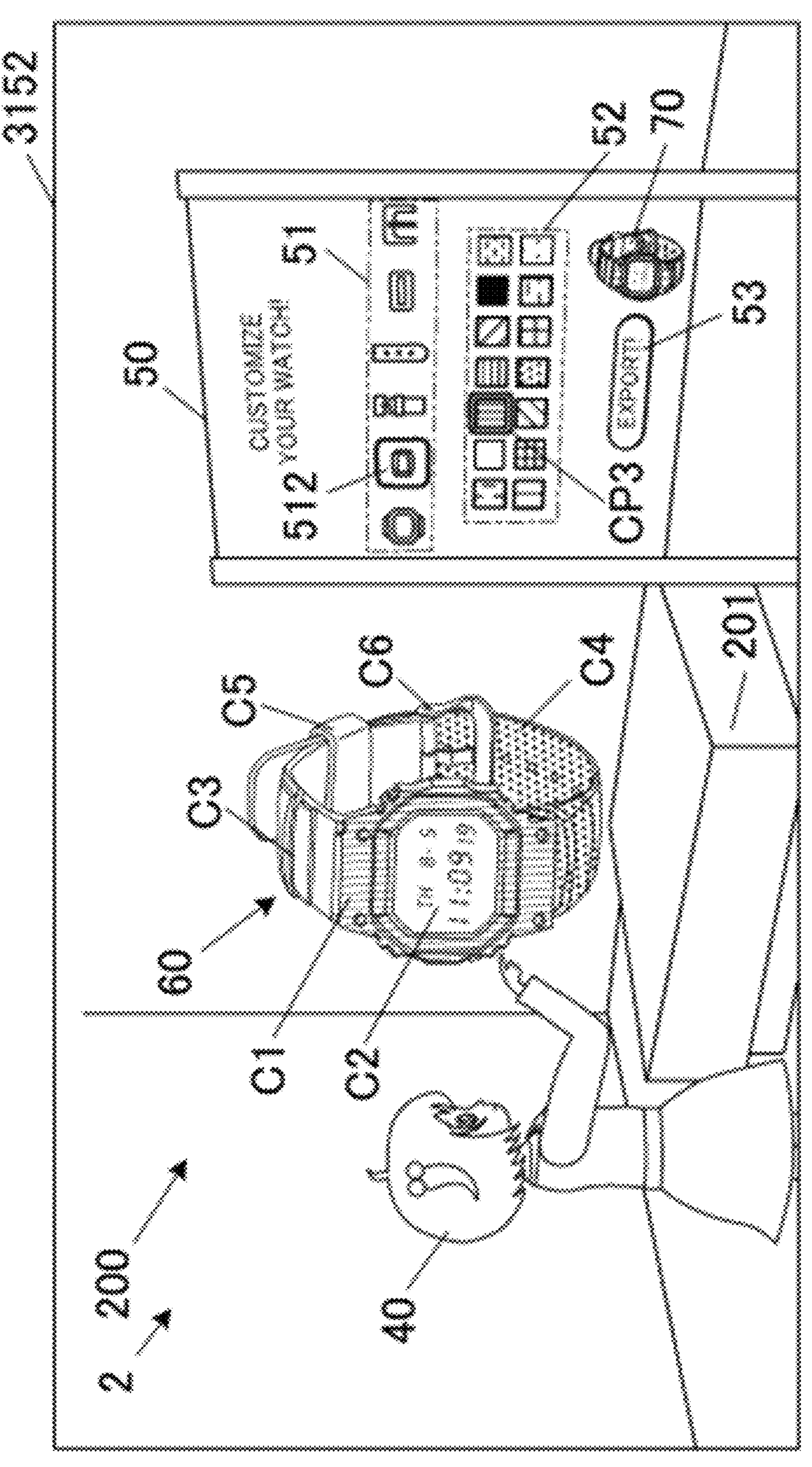
FIG. 9 is a diagram showing a state in which a product object is generated in response to a selection of an export button.

FIG. 9 shows the state in which the product object 70 is generated in response to the selection of the export button 53.

When the export button 53 is selected, a product object 70 with the same design as the sample object 60 at that time is generated near the export button 53 and displayed (outputted).

The object data 232 received from the VR server 10 contains image data for the customizations that can be selected for each component C of the product object 70 in advance. Each component C of the product object 70 may be a reduced version of each component C of the sample object 60, and the image data of each component C may be shared between the product object 70 and the sample object 60. The control device 20 generates image data of the entire product object 70 by combining the image data of each component C of "shape" and "color" specified by customization using the IF object 50, and transmits it to the VR device 30 for display.

Alternatively, the VR server 10 that has received the data representing the customization details may generate image data of the product object 70 with the customization details specified by the data, and transmit the image data to the control device 20.

The generated product object 70 is held by or attached to a predetermined part of the avatar 40 when the avatar 40 performs a predetermined movement. When the avatar 40 holding or wearing the product object 70 moves in the virtual space 2, the position and orientation of the product object 70 in the virtual space 2 follows the position and orientation of the part of the avatar 40 where it is attached.

When the avatar 40 holding or wearing the generated product object 70 moves to the checkout counter 202 and performs a predetermined operation (for example, pressing a purchase button not shown), it is possible to start a purchase procedure for purchasing (obtaining) the product object 70, or a purchase procedure for purchasing (obtaining) a real-world watch product that has been customized in the same way as the product object 70. When the product object 70 is purchased, the product object 70 is given to the user's avatar 40. That is, as shown in FIG. 3, the customized product object 70 is registered in the avatar data 133 in association with the avatar 40 as a possessed object of the avatar 40. The possessed object that has been purchased may be taken out of the virtual store 200 in the virtual space 2, for example.

<Operations Related to Adjustment of IF Objects and Sample Objects According to Avatar Characteristics>

The configurations of the above-mentioned IF object 50 and sample object 60 are determined based on the avatar information Ia related to the characteristics of the avatar 40 that performs the operations related to customization. In this embodiment, the main processing unit that makes this decision is the control device 20. The following describes an example in which the avatar 40 with avatar ID "A001" shown in FIG. 3 performs an operation related to customization.

The arrangement of the plurality of color palettes CP1 to 14 in the color selection IF52 of the IF object 50, i.e., the order of the colors, is determined based on the proportions of the plurality of avatar colors in the avatar information Ia of the avatar 40 that perform customization. The determined arrangement is registered in the color palette data 234.

Figure 10:
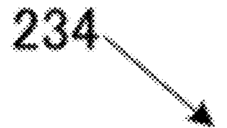
FIG. 10 is a diagram showing content of color palette data.

FIG. 10 is a diagram showing the content of color palette data 234.

In the color palette data 234, the colors of respective color palettes CP1 to CP14 in the determined arrangement are registered. Of these, the colors of color palettes CP1 to CP6 correspond to avatar color 1 to avatar color 6 in the avatar information Ia, respectively. Here, the colors of color palettes CP1 to CP6 in the color palette data 234 in FIG. 10 are yellow, white, blue, red, orange, and black, corresponding to the avatar color 1 to avatar color 6 in the avatar information Ia in FIG. 3 being yellow, white, blue, red, orange, and black, respectively (note that the avatar color 5 and avatar color 6 are omitted from FIG. 3).

The colors of the remaining color palettes CP7 to CP14 are the colors that are not registered in the color palettes CP1 to CP6 out of a predetermined number of default colors. Those multiple default colors may be given different priority numbers, and colors may be registered such that a color palette CP of a lower number is assigned with a default color given a higher priority.

In addition, it is also possible to display only the color palettes CP of the avatar colors used in the avatar 40 (in the example of FIG. 10, the color palettes CP1 to CP6 only) without using color palettes CP of the default colors.

In this way, the arrangement of the plurality of color palettes CP1 to CP14 is determined so that the order corresponds to the proportions of the plurality of avatar colors in the avatar information Ia.

The content of the color palette data 234 is reflected in the arrangement of the color palettes CP1 to CP14 in the IF object 50 displayed in the virtual space 2. As a result, in the IF object 50 of FIG. 7, the color palettes CP1 to CP6 of avatar color 1 to avatar color 6 are arranged in order from the left side of the first row, which is the most noticeable from the avatar 40. This arrangement of the color palettes CP1 to CP14 makes it easier to customize the color of the component C to match the appearance of the avatar 40.

In addition, the colors (color scheme) of the multiple objects of the sample object 60 before the operation related to customization by the avatar 40 is started are determined according to the proportions of the avatar colors in the avatar information Ia. The determined color scheme is registered in the sample color scheme data 235.

FIG. 11 is a diagram showing the content of the sample color scheme data 235.

In the sample color scheme data 235, the colors of each component C of the sample object 60 are set and registered. A priority order (1 to 6 in descending order) is predefined for each component C. In this embodiment, the priority order is the bezel C1, face C2, short band C3, long band C4, strap keeper C5, and buckle C6 from high to low. The priority order of the components C can be determined as appropriate. In this embodiment, the components C located closer to the front side (visible side) in the normal usage state of the product object 70 are given a higher priority (i.e., the components C that are more likely to catch the eye of the avatar 40 (user)).

In color scheme "a" of the sample color scheme data 235, colors are assigned such that a component C with a higher priority is assigned a color having a greater proportion in the avatar information Ia. That is, the avatar color 1 to avatar color 6 in the avatar information Ia are assigned to components C with priorities 1 to 6, respectively. In color schemes "b" and "c," the combination of avatar color 1 to avatar color 3 for priorities 1 to 3 differs from that of color scheme "a," and the combination of avatar color 4 to avatar color 6 for priorities 4 to 6 differs from that of color scheme "a." Color schemes other than color schemes "a" to "c" may be registered in the sample color scheme data 235. For example, a color scheme may be registered in which avatar color 1 to avatar color 6 are assigned to component C with priorities 1 to 6 randomly or according to a predetermined rule.

Before the operation related to customization by the avatar 40 is started, for example, when the avatar 40 enters the virtual store 200, the sample color scheme data 235 is generated based on the avatar data 233. Then, the setting of the first color scheme "a" in the sample color scheme data 235 is reflected in the color of each component C in the sample object 60 displayed in the virtual space 2. This allows the default color scheme of the sample object 60 to be a color scheme that matches the appearance of the avatar 40.

Also, before the operation related to customization by the avatar 40 is started, the color scheme of the sample object 60 may be switched between color scheme "a," color scheme "b," color scheme "c," . . . in the sample color scheme data 235 every time a predetermined display time has elapsed. In this case, when the operation related to customization by the avatar 40 is started (for example, when any icon of the target selection IF 51 of the IF object 50 is selected), the change in colors of the sample object 60 is stopped. This allows the user to start customization with a color scheme that is closest to the customization details desired by the user among the color schemes of the sample object 60 that match the appearance of the avatar 40.

In the above description, the arrangement of the color palettes CP1 to CP14 and the color scheme of the sample object 60 are determined based on the proportions of the plurality of avatar colors used in the entire avatar 40, but the present disclosure is not limited to this. For example, the arrangement of the color palettes CP1 to CP14 and the color scheme of the sample object 60 may be determined based on the proportions of a plurality of colors used in a predetermined part of the avatar 40. The predetermined part may be a part of the avatar 40 on which an object to be customized is attached, or a portion including that part. For example, if the target object is a watch product object 70, the arm on which the product object 70 is attached, or the upper body including the arm, may be the predetermined part.

<Customization Process>

Next, the customization process executed by the CPU 21 of the control device 20 to realize the customization operation of the sample object 60 and the product object 70 will be described.

Figure 12:
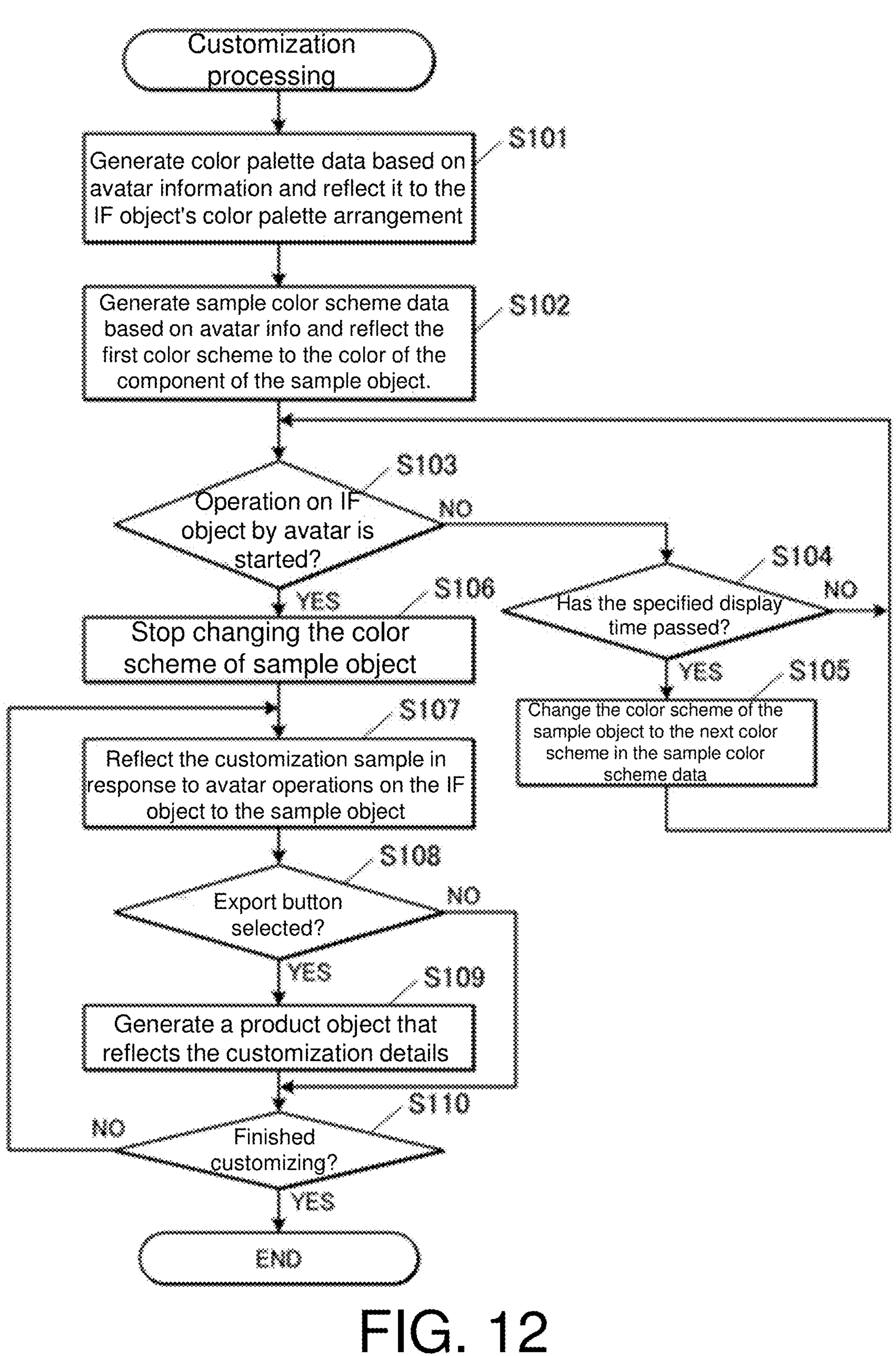
FIG. 12 is a flowchart showing a control procedure for a customization process.

FIG. 12 is a flowchart showing the control procedure of the customization process.

The customization process is started when the avatar 40 performing the operation related to the customization is identified (for example, when the user's avatar 40 enters the virtual store 200).

When the customization process is started, the CPU 21 of the control device 20 determines the arrangement of the plurality of color palettes CP1 to CP14 based on the avatar information Ia of the avatar data 233 so that the order is in accordance with the proportions of the plurality of avatar colors, and generates the color palette data 234. The CPU 21 also reflects the arrangement in the generated color palette data 234 to the arrangement of the color palettes CP1 to CP14 in the IF object 50 being displayed (Step S101).

The CPU 21 determines a plurality of color schemes (color scheme "a," color scheme "b," . . . ) of the components C of the sample object 60 based on the avatar information Ia so that the colors correspond to the proportions of the plurality of avatar colors, and generates the sample color scheme data 235. The CPU 21 also reflects the first color scheme "a" in the generated sample color scheme data 235 to the color scheme of the component C of the sample object 60 (Step S102).

The CPU 21 determines whether or not an operation on the IF object 50 by the avatar 40 has been started (Step S103). For example, the CPU 21 determines that an operation on the IF object 50 has been started when any icon of the target selection IF 51 of the IF object 50 is selected by the avatar 40. If it is determined that the operation has not been started (Step S103: NO), the CPU 21 determines whether or not a predetermined display time has elapsed as the time for displaying one color scheme of the sample object 60 (Step S104). If it is determined that the display time has not elapsed (Step S104: NO), the CPU 21 returns the process to Step S103. If it is determined that the display time has elapsed (Step S104: YES), the CPU 21 changes the color scheme of the component C of the IF object 50 to the next color scheme in the sample color scheme data 235 (Step S105). Here, the next color scheme is the color scheme adjacent to the right of the color scheme currently being displayed in the sample color scheme data 235 of FIG. 11. If the color scheme currently being displayed is the color scheme at the right end, color, the next color scheme returns to color scheme "a." When Step S105 ends, the CPU 21 returns the process to Step S103.

If it is determined in Step S103 that an operation by the avatar 40 on the IF object 50 has begun ("YES" in Step S103), the CPU 21 stops changing the color scheme of the component C of the sample object 60 (Step S106). Thereafter, each time an operation by the avatar 40 on the IF object 50 is performed, the CPU 21 reflects the customization corresponding to that operation to the sample object 60 (Step S107). In other words, when an operation to select one of the color palettes CP is performed by the avatar 40, the CPU 21 changes the color of the component C being selected by the target selection IF 51 to the color of the selected color palette CP.

The CPU 21 determines whether or not the export button 53 has been selected (Step S108), and if it is determined that the export button 53 has been selected ("YES" in Step S108), it generates and displays a product object 70 that reflects the customization details of the sample object 60 at that time (Step S109).

If it is determined that the export button 53 has not been selected ("NO" in Step S108), or if Step S109 has ended, the CPU 21 determines whether or not customization by the avatar 40 has ended (Step S110). For example, the CPU 21 determines that customization has ended when the avatar 40 starts an action related to purchasing the product object 70 at the checkout counter 202 or when the avatar 40 leaves the virtual store 200. If the CPU 21 determines that customization is not complete ("NO" in Step S110), it returns the process to Step S107, and if it is determined that customization is complete ("YES" in Step S110), it ends the customization process.

Modification Example

Next, a modification example of the above embodiment will be described. Below, differences from the above embodiment will be described, and the descriptions of the configurations that are common to the above embodiment will be omitted.

In this modification example, the arrangement of color palettes CP1 to CP14 is determined based on the colors used for the plurality of parts P of the avatar 40 and their proportions.

Figure 13:
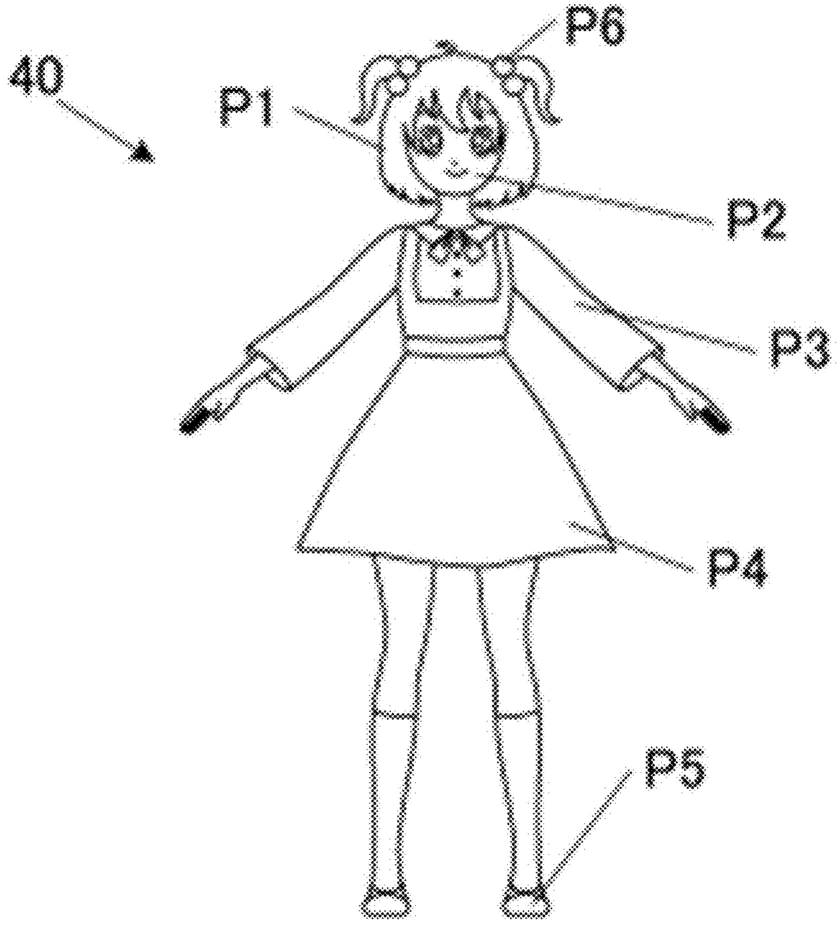
FIG. 13 is a diagram showing multiple parts of an avatar.

FIG. 13 is a diagram showing a plurality of parts P1 to P6 of the avatar 40.

As shown in FIG. 13, the part P1 of the avatar 40 is hair and/or a hat. The part P2 is a face and/or face paint. The part P3 is clothing worn on the upper body. The part P4 is clothing worn on the lower body. The part P5 is shoes. The part P6 is an accessory (a hair clip in the example shown in FIG. 13). The parts P1 to P6 shown in FIG. 13 are examples and the present disclosure is not limited to these. In the following, any one of the parts P1 to P6 will be referred to as a "part P".

Avatar information Ia in the avatar data 133 and 233 of this modification example includes avatar part information Ib related to the parts P1 to P6 of the avatar 40.

FIG. 14 is a diagram showing the content of the avatar part information Ib.

The avatar part information Ib includes information on a plurality of colors used in the appearance of the respective parts P1 to P6 of the avatar 40, and information on the percentage that each color accounts for in the overall appearance of each part P. In FIG. 14, the colors for each part P are labeled "part color 1," "part color 2," and "part color 3," in descending order of percentage. For example, for the part P3 (upper body clothing), the part color 1 is "pink (50%)," the part color 2 is "red (30%)," and the part color 3 is "white (20%)." If four or more colors are used for a certain part P, data for "part color 4" and onward may be further registered.

As shown in FIG. 14, in the avatar part information Ib, the corresponding relationships between the plurality of parts P1 to P6 and the plurality of components C of the product object 70 are registered in advance. In this modification example, the part P1 corresponds to the bezel C1, the part P2 corresponds to the face C2, the part P3 corresponds to the short band C3, the part P4 corresponds to the long band C4, the part P5 corresponds to the strap keeper C5, and the part P6 corresponds to the buckle C6.

The corresponding relationships between the parts P of the avatar 40 and the components C does not have to be fixed. For example, the corresponding relationships may be automatically changed depending on the situation in the virtual space 2 (e.g., time period, date, etc.) or the characteristics of the avatar 40 (e.g., type, such as human, animal, non-human (robot, vegetable, etc.)). Also, the user may be able to change the corresponding relationships between the parts P and the components C at will. For example, if an avatar 40 does not have a part corresponding to the part P1 as a feature (i.e., an avatar 40 does not have elements corresponding to hair/hat), the colors and the proportions of the "part color 1," "part color 2," and "part color 3" corresponding to the part P1 may be regarded as the same setting as the colors and the proportions of the "part color 1," "part color 2," and "part color 3" corresponding to the part P2. According to this, when the bezel icon 511 is selected, the order of the colors in the color palettes CP1 to CP14 in the color selection IF 52 becomes the same as the order of the colors in the color palettes CP1 to CP14 when the face icon 512 is selected. As described above, when the settings are regarded as the same, parts that are close to each other are automatically selected (for the "hair/hat" part, the values (type of color, proportions) set for the "face/face paint" adjacent thereto is reflected).

In this modification example, when a component C to be customized is selected by the target selection IF 51 in the IF object 50 shown in FIGS. 7 to 9, the arrangement (order of colors) of the color palettes CP1 to CP14 in the color selection IF 52 is changed to an arrangement corresponding to the selected component C. The arrangement of the color palettes CP1 to CP14 corresponding to the component C is determined based on the proportions of the part colors in the avatar part information Ib, and is registered in the color palette data 234.

FIG. 15 is a diagram showing the content of the color palette data 234 according to the modification example.

In the color palette data 234 of this modification example, the arrangement of the color palettes CP1 to CP14 is registered for each component C. In the arrangement of the color palettes CP1 to CP14 corresponding to each component C, the part color 1 to part color 3 (part color 1 and part color 2 if the part color 3 is not present) of the corresponding component C in the avatar part information Ib are assigned in order from the color palette CP with the smaller number. For example, in the arrangement of color palettes CP1 to CP14 corresponding to the part P3 (upper body clothing) and short band C3, pink, which is the part color 1 of the part P3, is assigned to the color palette CP1, red, which is the part color 2 of the part P3, is assigned to the color palette CP2, and white, which is the part color 3 of the part P3, is assigned to the color palette CP3. The colors of the remaining color palettes CP are colors other than the assigned part colors selected from a predetermined number of default colors.

In this way, the arrangement of color palettes CP1 to CP14 for selecting the colors of a component C corresponding to a certain part P is determined based on the information related to the colors of the certain part P in the avatar part information Ib.

When a certain component C is selected by the target selection IF 51, the arrangement of color palettes CP1 to CP14 in the IF object 50 is changed to an arrangement corresponding to the selected component C from the color palette data 234. As a result, as shown in FIG. 7, the color palettes CP1 to CP3 for the part color 1 to part color 6 are arranged in order from the left side of the first row, which is most likely to catch the eye of the avatar 40. Arranging the color palettes CP1 to CP14 in this way makes it easy to customize the colors of a component C to match the appearance of the corresponding part P of the avatar 40.

In the above, an example has been described in which one part P of the avatar 40 corresponds to one component C of the product object 70, but the present disclosure is not limited to this, and one part P may correspond to a plurality of components C, for example.

For example, the part P3 (upper body clothes) of the avatar 40 may correspond to the bezel C1, face C2, and short band C3, and the part P4 (lower body clothes) may correspond to the long band C4, strap keeper C5, and buckle C6. In this case, the arrangement of color palettes CP1 to CP14 corresponding to the bezel C1, face C2, and short band C3 is the same as the arrangement for the short band C3 corresponding to the part P3 in FIG. 15, and the arrangement of color palettes CP1 to CP14 corresponding to the long band C4, strap keeper C5, and buckle C6 is the same as the arrangement for the long band C4 corresponding to the part P4 in FIG. 15.

Furthermore, the arrangement of the color palettes CP1 to CP14 corresponding to all components C may be the same as the arrangement for a single part P according to the proportions of the colors of that part P.

Figure 16:
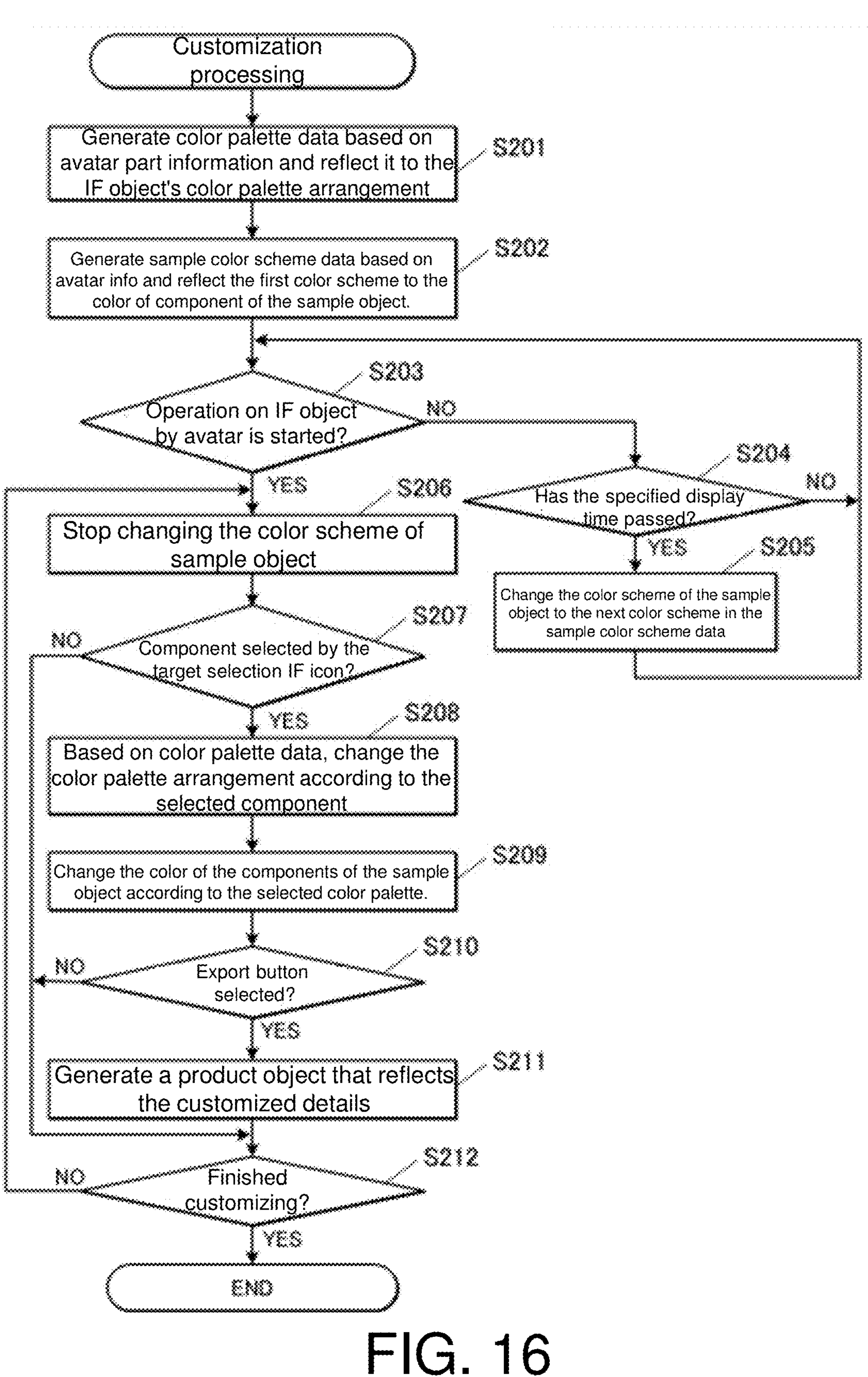
FIG. 16 is a flowchart showing a control procedure for a customization process according to a modification example.

FIG. 16 is a flowchart showing the control procedure of the customization process according to the modification example.

When the customization process is started, the CPU 21 of the control device 20 determines the arrangement of the color palettes CP1 to CP14 for selecting the colors of the component C corresponding to each part P based on the avatar part information Ib of the avatar data 233, and generates the color palette data 234. The CPU 21 also reflects one arrangement (e.g., an arrangement corresponding to the part P1) from the generated color palette data 234 to the arrangement of the color palettes CP1 to CP14 in the IF object 50 being displayed (Step S201). At this stage, the arrangement of the color palettes CP1 to CP14 being displayed may be a predetermined default arrangement.

Then, the CPU 21 executes the processes of Steps S202 to S206. The processing of Steps S202 to S206 are the same as that of Steps S102 to S106 in FIG. 12, and therefore the description thereof will be omitted. After Step S206 is completed, the CPU 21 determines whether or not a component C has been selected by the icon of the target selection IF 51 (Step S207). If it is determined that a component C has been selected ("YES" in Step S207), the CPU 21 changes the arrangement of color palettes CP1 to CP14 to the arrangement corresponding to the selected component C based on the color palette data 234 (Step S208). The CPU 21 changes the color of the selected component C in the sample object 60 in response to the selection of the color palette CP by the avatar 40 (Step S209).

After this, the CPU 21 executes the processing of Steps S210 to S212. The processing of Steps S210 to S212 are the same as that of Steps S108 to S110 in FIG. 12, and therefore the description thereof will be omitted.

As described above, in the information processing method of an embodiment of the present disclosure, avatar information related to the characteristics of the avatar 40 performing actions for customization of the product object 70 in the virtual space 2 is obtained, and the configuration of the IF object 50 and the sample object 60 as customization objects used for customization in the virtual space 2 is determined based on the avatar information.

In the technology disclosed in the above-mentioned Japanese Patent Application Laid-Open Publication No. 2008-217142, the color and shape, etc., of the product object cannot be customized according to the characteristics, etc., of the avatar, and even objects that do not match the characteristics of the avatar must be used as is. On the other hand, according to the present disclosure, by providing the above configuration, the product object 70 can be easily customized to match the characteristics of the avatar 40 by using the IF object 50 and the sample object 60 in which the characteristics of the avatar 40 are reflected in advance.

The customization object is an IF object 50 having a plurality of color palettes CP1 to CP14 (a plurality of selection markers) used by the avatar 40 to select the customization details of the product object 70, and in the above information processing method, the arrangement of the plurality of color palettes CP1 to CP14 is determined based on the avatar information. As a result, by using the IF object 50 in which the characteristics of the avatar 40 are reflected in advance, the product object 70 can be easily customized to match the characteristics of the avatar 40.

Further, the IF object 50 has a plurality of color palettes CP for each of a plurality of components C of the product object 70 that are used by the avatar 40 to select the customization details of each component C. As a result, the component C of the product object 70 can be easily customized to match the characteristics of the avatar 40.

The plurality of selection markers are the plurality of color palettes CP1 to CP14 (a plurality of color selection markers) for selecting the respective colors of the plurality of components C, and the avatar information has information related to the proportions of the plurality of colors used in the entire avatar 40 or a predetermined part thereof, and in the above information processing method, the arrangement of the plurality of color palettes CP1 to CP14 is determined based on the avatar information so that the arrangement order corresponds to the proportions of the plurality of colors. By selecting a color for the component C using the color palettes CP1 to CP14 arranged in this manner, it is possible to easily customize the color of the component C to a color that matches the appearance of the avatar 40.

Furthermore, the avatar information (as well as the avatar part information Ib) has information on at least one color used for each of the plurality of parts P of the avatar 40 that have a predetermined correspondence with the plurality of components C, and in the above information processing method, an arrangement of a plurality of color palettes CP1 to CP14 for selecting the color of a component C corresponding to a certain part P is determined based on the information on at least one color of the certain part P in the avatar information (including the avatar part information Ib). By selecting a color for the component C using the color palettes CP1 to CP14 arranged in this manner, it is possible to easily customize the color of the component C to a color that matches the appearance of the corresponding part P of the avatar 40.

The customization object is the sample object 60 for showing the customization details of the product object 70. The product object 70 and the sample object 60 have a plurality of components C in common. The avatar information has information related to the proportions of a plurality of colors used in the entire avatar 40 or a predetermined part thereof, and in the above information processing method, the color of each of the plurality of components C of the sample object 60 at the start of the operation for customization performed by the avatar 40 is determined according to the proportions of the plurality of colors in the avatar information. This makes it possible to make the default color scheme of the sample object 60 a color scheme that matches the appearance of the avatar 40. Therefore, customization can be started from a color scheme that matches the appearance of the avatar 40, and customization to colors that match the appearance of the avatar 40 can be easily performed.

Furthermore, priorities are set for the plurality of components C in advance, and in the above information processing method, the color of each of the plurality of components C of the sample object 60 may be determined such that a component C with a higher priority is assigned a color having a greater proportion in the avatar information. This allows the default color scheme of the sample object 60 to be closer to the impression of the appearance of the avatar 40.

Furthermore, the product object 70 may be an object that can be attached to a specific part P of the avatar 40, and in the above information processing method, the color of each of the plurality of components C of the sample object 60 may be determined according to the proportions of the plurality of colors used in the specific part P of the avatar information Ib or a part including that part P. This allows the default color scheme of the sample object 60 to be a color scheme that matches the appearance of a specific part of the avatar 40.

In the above information processing method, before the start of an operation for customization performed by the avatar 40, each time a predetermined display time has elapsed, the color of each of the plurality of components C of the sample object 60 is changed according to the proportions of the plurality of colors in the avatar information. This makes it possible to present the user with a plurality of color schemes of the sample object 60 that match the appearance of the avatar 40 each time a predetermined display time has elapsed.

In the above information processing method, when the operation for customization performed by the avatar 40 has been started, the automatic change in color of each of the plurality of components C of the sample object 60 is stopped. This makes it possible to start customization from a color scheme that is closest to the customization details desired by the user, out of the multiple color schemes of the sample object 60 that match the appearance of the avatar 40.

The information processing system 1 and control device 20 according to the embodiments of the present disclosure also include the CPU 21, which acquires avatar information related to the characteristics of the avatar 40 that performs actions related to customization of the product object 70 in the virtual space 2, and determines the configuration of the IF object 50 and the sample object 60 as customization objects used for customization in the virtual space 2 based on the avatar information. This makes it possible to easily customize the product object 70 to match the characteristics of the avatar 40.

The program 231 according to an embodiment of the present disclosure causes the CPU 21 to execute a process of acquiring avatar information related to the characteristics of the avatar 40 performing an action related to customization of the product object 70 in the virtual space 2, and a process of determining the configuration of the IF object 50 and the sample object 60 as customization objects used for customization in the virtual space 2 based on the avatar information. This allows the product object 70 to be easily customized to match the characteristics of the avatar 40.

In addition, in the information processing method executed by the CPU 311 of the VR device 30 including the display unit 315, and the operation input unit 314, the sensor unit 317, the controller 32, and the operation input unit 324 as input units, the IF object 50 and the sample object 60 as customization objects used for customizing the product object 70 in the virtual space 2 are displayed on the display unit 315, and the configuration of the customization objects is determined based on the avatar information related to the characteristics of the avatar 40 performing actions for customization in the virtual space 2. This allows the product object 70 to be easily customized to match the characteristics of the avatar 40.

(Other)

The present disclosure is not limited to the above embodiment, and various modifications are possible.

For example, in the above embodiment, the customization process is executed by the CPU 21 of the control device 20, but instead, at least a part of the customization process may be executed by the CPU 11 of the VR server 10.

As one example, the CPU 11 of the VR server 10 may determine the arrangement of the color palettes CP1 to CP14 based on the avatar information and generate the color palette data 234, as well as determine the color scheme of the component C of the sample object 60 and generate the sample color scheme data 235. In this case, the VR server 10 corresponds to the information processing device, and the CPU 11 of the VR server 10 corresponds to the processing unit.

Furthermore, the functions of the control device 20 may be integrated into the VR server 10, omitting the control device 20, and the VR service may be executed by the VR server 10 and the VR device 30. In this case, signals output from the operation input unit 324 and the sensor unit 325 of the VR device 30 are transmitted to the communication unit 14 of the VR server 10 via the communication unit 326. The VR server 10 controls the movement of the avatar 40 in the virtual space 2 in response to the received user operation. In other words, the VR server 10 performs the same process as the control device 20 described above, generates image data of the virtual space 2, and transmits it to the VR device 30.

Furthermore, the functions of the control device 20 may be integrated into the VR device 30 (for example, the VR headset 31), omitting the control device 20.

Furthermore, instead of (or in addition to) customization for changing the color of the component C of the product object 70 and the sample object 60, customization for changing the pattern of the component C may be possible. In this case, the pattern applied to the exterior of the avatar 40 may be reflected to the pattern of the component C.

Furthermore, in the above embodiments, the determination of the arrangement of the color palettes CP1 to CP14 and the determination of the color scheme of the component C of the sample object 60 based on the avatar information have been described, but the present disclosure is not limited to this. For example, when the exterior of the avatar 40 (the exterior of the body in a human form) is made of metal (such as a robot with a metallic exterior), the arrangement of the color palettes CP1 to CP14 may be determined taking into consideration not only the order of the colors but also the order of the materials. Specifically, the color palette CP1 may be arranged with silver (metal material), CP2 with gold (metal material), CP3 with black (metal material), and CP4 with blue (resin material). In this case, the avatar information may also have an item of "material/texture" in addition to the colors used, and values such as "metal" and "human skin" may be set. Alternatively, instead of or in addition to the appearance of the avatar 40, the arrangement of the color palettes CP1 to CP14 may be determined according to the proportions and quantities of materials of the objects possessed by the avatar 40. For example, if the avatar 40 possesses (wears) three metal rings, bracelets, and necklaces, the metal materials are arranged with higher priorities on the color palettes CP1 to CP14 as described above. This allows the objects to be customized to match not only the colors of the avatar 40, but also the appearance and the characteristics of the objects possessed.

In the above embodiments, an example was described in which the avatar information was used to determine the arrangement of the color palettes CP1 to CP14 and the color scheme of the components C of the sample object 60. However, the present disclosure is not limited to this. For example, the avatar information may be used to determine only one of the arrangement of the color palettes CP1 to CP14 and the color scheme of the components C of the sample object 60.

When only the arrangement of the color palettes CP1 to CP14 is determined based on the avatar information, the default color scheme of the sample object 60 may be set such that all the components C are white.

When only the color scheme of the sample object 60 is determined based on the avatar information, the arrangement of the color palettes CP1 to CP14 may be a predetermined default arrangement.

In the above embodiment, the customization is performed for each component C of the product object 70. However, the present discloser is not limited to this, and the customization may be performed for the entire product object 70.

Also, the user may operate the avatar 40 without wearing the VR headset 31. In this case, instead of the VR headset 31, an image of the virtual space 2 is displayed on a normal display (e.g., a liquid crystal display included in the display unit 25 of the control device 20) provided in a position visible to the user. The screen displayed in this case may be the VR screen 3151 if the VR device 30 can detect the user's movements. Also, a third-person perspective screen may be displayed instead of the VR screen 3151. For example, the user may operate the controller 32 to move the avatar 40 in the virtual space 2 from a third-person perspective.

Although a watch product object 70 has been given as an example of the target object, the present disclosure is not limited to this and can be applied to an object of any item.

Although in the above description, an example was explained in which the HDD and SSD of the storage units 13 and 23 were used for a computer-readable medium for the program according to the present disclosure, the present disclosure is not limited to this example. As other computer-readable media, information recording media such as flash memory and CD-ROM can be applied. Furthermore, carrier waves can also be applied to the present disclosure as a medium for providing data for the program according to the present disclosure via a communication line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-159316, filed Sep. 25, 2023, which is hereby incorporated by reference herein in its entirety.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An information processing method comprising:

causing an information processing device having at least one memory and at least one processor, to perform the following:

acquiring avatar information related to characteristics of an avatar that performs an action related to customization of a target object in a virtual space; and determining a configuration of a customization object to be used for the customization in the virtual space based on the avatar information.

2. The information processing method according to claim 1, wherein the customization object is an interface object having a plurality of selection markers used by the avatar to select customization details for the target object, and wherein the information processing method includes determining an arrangement of the plurality of selection markers based on the avatar information.

3. The information processing method according to claim 2, wherein the interface object has the plurality of selection markers used by the avatar to select customization details for each of a plurality of components of the target object.

4. The information processing method according to claim 3, wherein the plurality of selection markers are a plurality of color selection markers for selecting a color of each of the plurality of components, wherein the avatar information has information related to proportions of the plurality of colors used in the entire avatar or a predetermined part of the avatar, and wherein the information processing method includes determining an arrangement of the plurality of color selection markers based on the avatar information so that the color selection markers are arranged in an order corresponding to the proportions of the plurality of colors.

5. The information processing method according to claim 1, wherein the plurality of selection markers are a plurality of color selection markers for selecting a color of each of the plurality of components, wherein the avatar information includes information on at least one color used for each of a plurality of parts of the avatar, the plurality of parts having a predetermined corresponding relationship with the plurality of components, and wherein the information processing method includes determining an arrangement of the plurality of color selection markers for selecting a color of a component corresponding to a certain part, based on the information on at least one color of the certain part in the avatar information.

6. The information processing method according to claim 1, wherein the customization object is a sample object for showing customization details of the target object, wherein the target object and the sample object have a plurality of components in common, wherein the avatar information has information related to proportions of a plurality of colors used in the entire avatar or a predetermined part of the avatar, and wherein the information processing method includes determining a color of each of the plurality of components of the sample object as default colors before the action related to the customization is started by the avatar, according to the proportions of the plurality of colors in the avatar information.

7. The information processing method according to claim 6, wherein priorities are assigned to the plurality of components in advance, and wherein the information processing method includes determining a color of each of the plurality of components of the sample object such that a component given a higher priority is assigned a color having a greater proportion in the avatar information.

8. The information processing method according to claim 6, wherein the target object is an object that can be attached to a predetermined part of the avatar, and wherein the information processing method includes determining a color of each of the plurality of components of the sample object according to the proportions of the plurality of colors used in the predetermined part or a portion including the predetermined part in the avatar information.

9. The information processing method according to claim 6, further including changing colors of the plurality of components of the sample object in accordance with the proportions of the plurality of colors in the avatar information every time a predetermined display time elapses while the action related to the customization by the avatar has not been started.

10. The information processing method according to claim 9, further including stopping the change of the colors of the plurality of components of the sample object when the action related to the customization by the avatar is started.

11. An information processing device comprising:

a processing unit that performs the following:

acquiring avatar information related to characteristics of an avatar that performs an action related to customization of a target object in a virtual space; and determining a configuration of a customization object to be used for the customization in the virtual space based on the avatar information.

12. The information processing device according to claim 11, wherein the customization object is an interface object having a plurality of selection markers used by the avatar to select customization details for the target object, and wherein the processing unit determines an arrangement of the plurality of selection markers based on the avatar information.

13. The information processing device according to claim 11, wherein the customization object is a sample object for showing customization details of the target object, wherein the target object and the sample object have a plurality of components in common, wherein the avatar information has information related to proportions of a plurality of colors used in the entire avatar or a predetermined part of the avatar, and wherein the processing unit determines a color of each of the plurality of components of the sample object at the start of the action related to the customization by the avatar according to the proportions of the plurality of colors in the avatar information.

14. A non-transitory computer readable storage medium, the storage medium storing therein a program that causes a computer to execute the following:

acquiring avatar information related to characteristics of an avatar that performs an action related to customization of a target object in a virtual space; and determining a configuration of a customization object to be used for the customization in the virtual space based on the avatar information.

15. The storage medium according to claim 14, wherein the customization object is an interface object having a plurality of selection markers used by the avatar to select customization details for the target object, and wherein the program causes the computer to determine an arrangement of the plurality of selection markers based on the avatar information.

16. The storage medium according to claim 14, wherein the customization object is a sample object for showing customization details of the target object, wherein the target object and the sample object have a plurality of components in common, wherein the avatar information has information related to proportions of a plurality of colors used in the entire avatar or a predetermined part of the avatar, and wherein the program causes the computer to determine a color of each of the plurality of components of the sample object at the start of the action related to the customization by the avatar according to the proportions of the plurality of colors in the avatar information.

17. An information processing system comprising:

a plurality of information processing devices each having at least one memory and at least one processor that executes one or more commands stored in the at least one memory, wherein the information processing system performs the following:

acquiring avatar information related to characteristics of an avatar that performs an action related to customization of a target object in a virtual space; and determining a configuration of a customization object to be used for the customization in the virtual space based on the avatar information.

18. The information processing system according to claim 17, wherein the customization object is an interface object having a plurality of selection markers used by the avatar to select customization details for the target object, and wherein the information processing system determines an arrangement of the plurality of selection markers based on the avatar information.

19. The information processing system according to claim 17, wherein the customization object is a sample object for showing customization details of the target object, wherein the target object and the sample object have a plurality of components in common, wherein the avatar information has information related to proportions of a plurality of colors used in the entire avatar or a predetermined part of the avatar, and wherein the information processing system determines a color of each of the plurality of components of the sample object at the start of the action related to the customization by the avatar according to the proportions of the plurality of colors in the avatar information.

* * * * *